Patented July 12, 1938

2,123,718

UNITED STATES PATENT OFFICE 2,123,718

ESTERS OF UREA-ALKYLENE OXIDE CONDENSATION PRODUCTS

Melvin De Groote, St. Louis, Mo., assignor to The Tret-O-Lite Company, Webster Groves, Mo., a corporation of Missouri No Drawing. Application December 24, 1936, Serial No. 117,581

18 Claims. (Cl. 260—99.40)

This invention relates to a novel composition of matter and, more particularly, to certain products or chemical compounds obtained by reaction between a polybasic carboxy acid body and the partial esterification product of a monocarboxy detergent-forming acid and the dihydroxy compound obtained by condensing urea or an alkylated urea with a plurality of molecular proportions of an alkylene oxide, such as ethylene oxide.

It is well known that certain carboxy acids may be combined with alkalies, such as caustic soda, caustic potash, ammonia, triethanolamine, and the like, to produce soap or soap-like materials. Common examples of these detergent-forming acids include the higher fatty acids, such as lauric acid, palmitic acid, oleic acid, stearic acid, ricinoleic acid, linoleic acid, linolenic acid, etc., as well as acids derived from rosin, such as abietic acid, and carboxy acids derived from hydrocarbon oils or associated with hydrocarbon oils, such as naphthenic acid.

It is obvious, of course, that various of the above carboxy acids can be subjected to simple modification or alteration which does not detract from their property of combining with alkalies to form soap or soap-like materials, provided that the unchanged carboxyl radical is present. For instance, oleic acid may be chlorinated or brominated and still have the same soap-forming properties as oleic acid itself. Similarly, ricinoleic acid may be acetylated without changing its detergent-forming properties. Likewise naphthenic acids may be hydrogenated. It is understood that such simple modifications are the obvious functional equivalents of the unaltered carboxy acids themselves.

Reference is made to U. S. Patent #2,059,273, dated November 3, 1936, to Piggott. This patent describes the production of the partial esterification products of higher fatty acids and the dihydroxy compound obtained by condensing urea with a plurality of molecular proportions of ethylene oxide. I employ the procedure described in said patent to produce intermediate products which are subsequently reacted with polybasic carboxy acids to produce the new chemical compound or composition of matter which constitutes my present invention. I have found that instead of ethylene oxide, one may employ any suitable alkylene oxide, such as butylene oxide, propylene oxide, etc., provided that the number of carbon atoms in the alkylene oxide or its equivalent are less than 10 in number. Similarly, one may employ glycidol which is a derivative of a glycerol instead of being a derivative of a glycol as in the case of an alkylene oxide. However, since glycerol may be considered as hydroxy propylene glycol, similarly, glycidol may be considered as hydroxy propylene oxide and is just as suitable as propylene oxide itself.

I have found that materials related to those described in the above mentioned patent can be produced by replacing a fatty acid with suitable detergent-forming carboxy acids derived from some other source, such as naphthenic acids, abietic acid, and the like. Similarly, I found that instead of urea one may employ an alkylated urea (see A Textbook of Organic Chemistry, Schmidt, Rule, Second Revised Edition, 1932, p. 334). I found that when materials of the kind described above are employed as intermediate products to react with polybasic carboxy acids, such as oxalic acid, phthalic acid, maleic acid, succinic acid, etc., that one obtains materials which may be used in the acidic state or which may be neutralized with a suitable base, or which may be combined with a suitable alcohol so as to give an ester. Such last described materials, particularly if of the water-soluble type, may be employed as wetting, washing, frothing, emulsifying, dispersing, softening and leveling agents, and also as assistants in the textile industry. Such materials which are oil-soluble may be used as plasticizing agents, and are particularly suitable for use in the formation of water-in-oil emulsions. Such of the materials which exhibit both water and oil solubility may be employed for all the various purposes noted above, and also for other applications in a variety of industries. All the various types, regardless of solubility, may be employed effectively in the demulsification of oil field emulsions which are of the water-in-oil type and commonly referred to as "cut oil", "roily oil", "emulsified oil" and "bottom settlings".

Insofar that the most desirable products are obtained from fatty acids rather than naphthenic acids or rosin acids, and insofar that urea is more readily available than alkylated ureas, and since the alkylene oxides are more readily available than glycidol, the following examples will employ the more readily available raw materials although it is understood, as previously pointed out, that obvious functional equivalents can be employed without departing from the character or kind of materials herein contemplated.

The partial esterification product of a higher monobasic fatty acid and the dihydroxy compound obtainable by condensing urea with a plurality of molecular proportions of ethylene oxide is believed to be represented by the following formula:

$$HO-C_2H_4-(O-C_2H_4)_n-NH-CO-NH(C_2H_4-O)_n-C_2H_4-O-COR$$

where $n$ may be any number up to 25 (preferably 20) and R—CO represents the radical of a fatty acid.

It is to be noted that such materials are characterized by the presence of at least one hydroxyl radical. If R—CO represents the radical of a hydroxylated fatty acid, such as ricinoleic acid, hydroxystearic acid, dihydroxystearic acid, etc., then the compound indicated by the preceding formula may contain two or more hydroxyl radicals, all of which are capable of combination (esterification) with polybasic carboxy acids, such as oxalic acid, maleic acid, phthalic acid, etc.

I have found that if such intermediate products, that is, the reaction product obtained from ethylene oxide or the like, urea, and a fatty acid, be analyzed so as to determine the acetyl value or hydroxyl value, then one can subject such material to reaction with an equivalent amount of a suitable polybasic carboxy acid, such as oxalic acid, maleic acid, phthalic acid, etc. so as to produce a new chemical compound or composition of matter which can be employed in the various manners above indicated. The preparation of the intermediate material prior to combination with the polybasic carboxy acid will be illustrated by the following examples numbered 1 to 5 inclusive.

Example 1

A mixture of 1 part of urea with 30 parts of ethylene oxide is heated in a closed pressure-resisting vessel at 120° C. for 9 hours. A brown mobile liquid is thus obtained and this is readily soluble in water to a clear solution. It is also soluble in ethyl alcohol. 90% of the ethylene oxide is found to have entered into combination.

Example 2

In this example about 35 parts of ethylene oxide are used to 1 part of urea (cf. Example 1). 12 parts of urea and 0.1 part of caustic soda as 8% aqueous solution are charged into an autoclave which is then closed. 44 parts of ethylene oxide are then pumped in and the mixture is heated to 85–90° C. in the course of 8–9 hours. Further ethylene oxide is then pumped in as the condensation proceeds. Such by-products (glycol etc.) as are volatile are now removed by evacuating the vessel and heating it at about 100° C. until nothing more distils over. The residue, being the desired product is then blown into a suitable receptacle. The product resembles that of Example 1; it is a brown viscous liquid, readily soluble in water and in fact miscible therewith in all proportions.

141 parts of the brown liquid are heated with 28 parts of oleic acid in an open pan at 160° C. until the melt is readily soluble in benzene.

Example 3

When instead of the oleic acid used in Example 2, 29 parts of ricinoleic acid are used, a dark brown greasy substance is obtained which is readily soluble in benzene and soluble in water.

Example 4

In Examples 1, 2 and 3 described previously, ethylene oxide is replaced by an equivalent amount of propylene oxide.

Example 5

In Examples 1, 2 and 3 described previously, ethylene oxide is replaced by an equivalent amount of butylene oxide.

As previously pointed out, having obtained intermediate materials in the manner described above or by employing abietic acid or naphthenic acid in place of various fatty acids, the next step involves analytical procedure of the kind employed in the analysis of fats, for example, in order to determine the acetyl or hydroxyl value. Having determined such value, one then calculates the stoichiometrical equivalent of a selected polybasic carboxy acid so as to unite therewith and to preferably leave one carboxyl radical unchanged, so that such free carboxyl radical may be united with a suitable base or esterified further with a suitable alcohol if desired. The preparation of this new compound or composition of matter is illustrated further by the following examples.

Example 6

An intermediate material is prepared in the manner described under Example 1. The material is analyzed so as to determine its hydroxyl value. To 100 lbs. of this material, there is added an equivalent amount of phthalic anhydride so as to form a material having one free carboxyl radical. Such material, after being formed under the action of heat, or in any other suitable manner, may be employed as such, or the free carboxylic hydrogen may be neutralized with an equivalent amount of triethanolamine, or other suitable basic material.

Example 7

An intermediate material is produced according to Example 2 above and analyzed so as to determine its hydroxyl value. This material is then treated in the same manner as described in Example 6 except that the phthalic anhydride is replaced by a suitable amount of oxalic acid. The acidic material so obtained may be used as such or may be employed after neutralization with diethanolamine.

Example 8

An intermediate material is prepared in the manner indicated in Example 3 above and analyzed so as to determine its hydroxyl content. It is to be noted that this material is substantially dihydroxylated due to the alcoholiform hydroxyl present in the ricinoleic acid radical. The material is treated with maleic anhydride in amounts sufficient to combine with either one hydroxyl or with both hydroxyls, and so as to have present after such combination one or two free carboxyl radicals, depending on the purpose for which it is intended. For use in demulsification, I prefer to combine the intermediate material with maleic anhydride so as to react with the equivalent of one hydroxyl only and then to neutralize with triethanolamine in a manner previously described.

Example 9

An intermediate material is prepared in the manner described in Example 3 above which is analyzed in the manner indicated previously and combined with sufficient phthalic anhydride to unite with all the available alcoholiform hydroxyl radicals. Such material is then esterified with glycerol so as to remove the free carboxylic hydrogen atoms present. Such material is particularly adaptable for use as a plasticizer and in the manufacture of resins.

Example 10

A compound is manufactured in the same manner as in Example 9 above, except that ricinoleic acid is replaced by an equivalent amount of polyricinoleic acid, consisting largely of diricinoleic and triricinoleic acid, with some higher polymers and a little unpolymerized ricinoleic acid present.

It is obvious that many modifications and variations may be employed without departing from the nature of the materials above described. A free carboxylic hydrogen atom may be present as such or may be replaced by a suitable metallic atom, as in the case of neutralization with caustic soda, caustic potash, calcium hydroxide, magnesium hydroxide, etc. Heavy metal salts may be prepared in the customary manner so as to obtain iron salts, copper salts, lead salts, etc. The material may be neutralized with ammonia or with amines, such as amylamine, cyclohexylamine, butylamine, benzylamine, etc. The materials may be esterified with various alcohols, such as monohydric alcohols, including ethyl alcohol, methyl alcohol, propyl alcohol, butyl alcohol, etc. The material may be combined with polyhydric alcohols, such as glycerol, ethylene glycol, propylene glycol, etc., or the alcohol ethers, such as polyglycerols, polyglycols, etc. One convenient procedure is to treat the intermediate materials of the kind described in Examples 1–5 above with an acid ester of a polybasic carboxy acid, such as ethylene hydrogen phthalate, butyl hydrogen phthalate, propylene hydrogen phthalate, etc.

The polybasic carboxy acids employed may be of the aromatic type, alkyl type, aralkyl type, cyclic type, heterocyclic type, etc. Suitable examples including those previously pointed out are succinic, maleic, malic, aconitic, tataric, citric, fumaric, tricarballylic, trihydroxy-glutaric, mesoxalic, phthalic, oxalic, diphenic, naphthalic benzoyl-benzoic, trimesic, mellitic, cinchomeronic, quinolinic, camphoric, aspartic, norpinic, glutamic, etc. One may use the anhydrides instead of the acids themselves, or one may use the simple derivatives thereof.

It is understood that the esterification and neutralization processes employed are the kind which are used conventionally in the manufacture of various chemical compounds and which are employed widely in organic chemical manufacture. Such esterification reactions generally take place on the application of heat and particularly with the passage of a dried gas, such as dried air, dried carbon dioxide, or dried hydrochloric acid gas through the mixture. Sometimes the esterification reactions may be conducted most conveniently in the presence of a high boiling solvent, such as xylene, in such a manner that the condensate represents a mixture of xylene and water, which after condensation is returned through a trap in which a separation takes place, and by means of which the water is withdrawn and the xylene, for example, returned for further use under the reflux condenser. If such procedure is followed, it is necessary to remove the solvent, xylene for example, upon completion of the reaction. Any derivative of the carboxy acid which functions in the esterification reaction in the same manner as the acid itself, such as the anhydride for example, may be employed just as advantageously. Chlorphthalic acid is just as suitable as phthalic acid itself. Similarly, bromnaphthalic acid may be used in place of naphthalic acid. Sulfophthalic or sulfo-succinic acids, for example, may be used in place of phthalic acid and succinic acids, respectively. Compounds formed with maleic acid may be reacted with bisulfites, such as sodium bisulfite.

It is understood that the use of the products is not limited to any particular isomeric form of the chemical compound or compounds disclosed, but that one isomeric form is as suitable as another. As previously pointed out, the anhydride of a polycarboxy acid may be used instead of the acid itself. Commercially, phthalic anhydride is available on a lower cost basis than phthalic acid. In the claims where reference is made to phthalic anhydride, it is understood, of course, that phthalic acid could be used equally well as its complete functional equivalent.

Having thus described my invention, what I claim as new and desire to secure by Letters Patent is:

1. As a new compound, the product obtainable by reaction between a polycarboxylic acid and a partial esterification product, the said partial esterification product being obtained by reaction between a monobasic monocarboxy detergent-forming acid selected from the class consisting of fatty acids, rosin acids, and petroleum acids and the dihydroxy compound obtainable by condensing urea with a plurality of molecular proportions of an alkylene oxide.

2. As a new compound, the product obtainable by reaction between a polycarboxylic acid and a partial esterification product, the said partial esterification product being obtained by reaction between a rosin acid and the dihydroxy compound obtainable by condensing urea with a plurality of molecular proportions of an alkylene oxide.

3. As a new compound, the product obtainable by reaction between a polycarboxylic acid and a partial esterification product, the said partial esterification product being obtained by reaction between a naphthenic acid and the dihydroxy compound obtainable by condensing urea with a plurality of molecular proportions of an alkylene oxide.

4. As a new compound, the product obtainable by reaction between a polycarboxylic acid and a partial esterification product, the said partial esterification product being obtained by reaction between a higher monobasic fatty acid and the dihydroxy compound obtainable by condensing urea with a plurality of molecular proportions of an alkylene oxide.

5. As a new compound, the product obtainable by reaction between a polycarboxylic acid and a partial esterification product, the said partial esterification product being obtained by reaction between a higher monobasic fatty acid and the dihydroxy compound obtainable by condensing urea with a plurality of molecular proportions of an ethylene oxide.

6. As a new compound, the product obtainable by reaction between a polycarboxylic acid and a partial esterification product, the said partial esterification product being obtained by reaction between a higher monobasic hydroxylated fatty acid and the dihydroxy compound obtainable by condensing urea with a plurality of molecular proportions of an ethylene oxide.

7. As a new compound, the product obtainable by reaction between a polycarboxylic acid and a partial esterification product, the said partial esterification product being obtained by reaction between ricinoleic acid and the dihydroxy compound obtainable by condensing urea with a plurality of molecular proportions of an ethylene oxide.

8. As a new compound, the product obtainable by reaction between an aromatic polycarboxylic acid and a partial esterification product, the said partial esterification product being obtained by reaction between ricinoleic acid and the dihydroxy compound obtainable by condensing urea with a plurality of molecular proportions of an ethylene oxide.

9. As a new compound, the product obtainable by reaction between phthalic anhydride and a partial esterification product, the said partial esterification product being obtained by reaction between ricinoleic acid and the dihydroxy compound obtainable by condensing urea with a plurality of molecular proportions of an ethylene oxide.

10. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of a monobasic monocarboxy detergent-forming acid selected from the class consisting of fatty acids, rosin acids, and petroleum acids and the dihydroxy compound obtainable by condensing urea with a plurality of molecular proportions of an alkylene oxide and characterized by the following type formula:

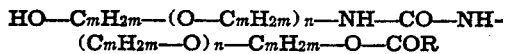

in which the symbol $m$ denotes a small number less than 10; $n$ represents any number up to 25; and R.CO indicates the acyl radical derived from a monobasic monocarboxy detergent-forming acid, selected from the class consisting of fatty acids, rosin acids, and petroleum acids.

11. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of a rosin acid and the dihydroxy compound obtainable by condensing urea with a plurality of molecular proportions of an alkylene oxide and characterized by the following type formula:

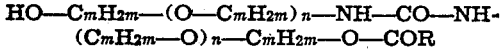

in which the symbol $m$ denotes a small number less than 10; $n$ represents any number up to 25, and R.CO indicates the acyl radical derived from a rosin acid.

12. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of a naphthenic acid and the dihydroxy compound obtainable by condensing urea with a plurality of molecular proportions of an alkylene oxide and characterized by the following type formula:

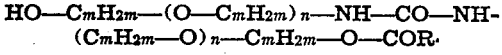

in which the symbol $m$ denotes a small number less than 10; $n$ represents any number up to 25, and R.CO indicates the acyl radical derived from a naphthenic acid.

13. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of a higher monobasic fatty acid and the dihydroxy compound obtainable by condensing urea with a plurality of molecular proportions of an alkylene oxide and characterized by the following type formula:

in which the symbol $m$ denotes a small number less than 10; $n$ represents any number up to 25, and R.CO indicates the acyl radical derived from a higher monobasic fatty acid.

14. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of a higher monobasic fatty acid and the dihydroxy compound obtainable by condensing urea with a plurality of molecular proportions of an ethylene oxide and characterized by the following type formula:

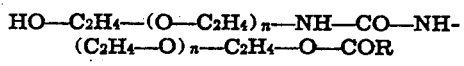

in which the symbol $n$ represents any number up to 25, and R.CO indicates the acyl radical derived from a higher monobasic fatty acid.

15. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of a higher monobasic hydroxylated fatty acid and the dihydroxy compound obtainable by condensing urea with a plurality of molecular proportions of an ethylene oxide and characterized by the following type formula:

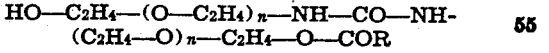

in which the symbol $n$ represents any number up to 25, and R.CO indicates the acyl radical derived from a higher monobasic hydroxylated fatty acid.

16. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxy alkyl radicals, T is a nucleus derived from a polycarboxylic acid, and D is a radical derived from the partial esterification product of ricinoleic acid and the dihydroxy compound obtainable by condensing urea with a plurality of molecular proportions of an ethylene oxide and characterized by the following type formula:

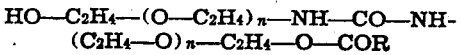

in which the symbol $n$ represents any number up to 25, and R.CO indicates the acyl radical derived from ricinoleic acid.

17. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkoxyalkyl radicals, T is a nucleus derived from an aromatic polycarboxylic acid, and D is a radical derived from the partial esterification product of ricinoleic acid and the dihydroxy compound obtainable by condensing urea with a plurality of molecular proportions of an ethylene oxide and characterized by the following type formula:

HO—$C_2H_4$—(O—$C_2H_4$)$_n$—NH—CO—NH-($C_2H_4$—O)$_n$—$C_2H_4$—O—COR in which the symbol $n$ represents any number up to 25, and R.CO indicates the acyl radical derived from ricinoleic acid.

18. A compound of the general formula type Z.OOC.T.COO.D, in which Z is a member selected from the class consisting of hydrogen atoms, metallic atoms, ammonium radicals, amine radicals, alkyl radicals, hydroxy alkyl radicals, and alkyoxy-alkyl radicals, T is a nucleus derived from a phthalic acid, and D is a radical derived from the partial esterification product of ricinoleic acid and the dihydroxy compound obtainable by condensing urea with a plurality of molecular proportions of an ethylene oxide and characterized by the following type formula:

HO—$C_2H_4$—(O—$C_2H_4$)$_n$—NH—CO—NH-($C_2H_4$—O)$_n$—$C_2H_4$—O—COR in which the symbol $n$ represents any number up to 25, and R.CO indicates the acyl radical derived from ricinoleic acid.

MELVIN DE GROOTE.